United States Patent
Elson et al.

(10) Patent No.: US 10,752,090 B2
(45) Date of Patent: Aug. 25, 2020

(54) OPERATOR CONFIGURABLE RADIANT HEATING SYSTEM AND RELATED METHOD

(71) Applicant: FORD GLOBAL TECHNOLOGIES, LLC, Dearborn, MI (US)

(72) Inventors: John Craig Elson, Bloomfield Township, MI (US); Victoria Leigh Schein, Dearborn, MI (US); Kerrie Kathleen Gath, Pittsfield, MI (US); Clay Wesley Maranville, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 373 days.

(21) Appl. No.: 15/674,018

(22) Filed: Aug. 10, 2017

(65) Prior Publication Data

US 2019/0047366 A1 Feb. 14, 2019

(51) Int. Cl.
*B60H 1/22* (2006.01)
*H05B 3/34* (2006.01)

(52) U.S. Cl.
CPC ......... *B60H 1/2215* (2013.01); *B60H 1/2226* (2019.05); *H05B 3/34* (2013.01); *B60H 2001/2278* (2013.01); *B60H 2001/2293* (2013.01); *H05B 2203/005* (2013.01);
(Continued)

(58) Field of Classification Search
CPC .. B60H 1/2215; B60H 1/2226; B60H 1/2225; B60H 1/2218; B60H 1/2227; B60H 2001/2293; B60H 2001/2278; B60H 2001/2246; H05B 3/34; H05B 3/342; H05B 3/18; H05B 3/16; H05B 3/0042; H05B 3/0019; H05B 2203/016; H05B 2203/026; H05B 2203/005; H05B 2203/029; H05B 2203/017; H05B 2203/006; H05B 2203/013; H05B 2203/015; H05B 1/0236; H05B 1/0238
See application file for complete search history.

(56) References Cited

U.S. PATENT DOCUMENTS

| | | |
|---|---|---|
| 4,920,759 A | 5/1990 | Tanaka et al. |
| 8,884,191 B2 | 11/2014 | Ogino et al. |
| 9,025,942 B2 | 5/2015 | Kamiyama |

(Continued)

FOREIGN PATENT DOCUMENTS

| | | |
|---|---|---|
| DE | 102010011102 A1 | 9/2011 |
| DE | 102012221116 A1 | 5/2014 |

(Continued)

OTHER PUBLICATIONS

English Machine Translation of DE102010011102A1.
(Continued)

*Primary Examiner* — Shawntina T Fuqua
(74) *Attorney, Agent, or Firm* — David Coppiellie; King & Schickli, PLLC

(57) ABSTRACT

An operator configurable radiant heating system is provided for a motor vehicle. That operator configurable radiant heating system includes a plurality of docking points provided at different locations within the motor vehicle and a radiant heating panel configured for docking with any of the docking points of the plurality of docking points. A related method is also disclosed.

20 Claims, 14 Drawing Sheets

(52) U.S. Cl.
CPC .. *H05B 2203/016* (2013.01); *H05B 2203/026* (2013.01); *H05B 2203/029* (2013.01)

(56) References Cited

U.S. PATENT DOCUMENTS

| | | | |
|---|---|---|---|
| 9,517,681 | B2 | 12/2016 | Alpert |
| 2009/0289045 | A1 | 11/2009 | Hotary |
| 2010/0176110 | A1* | 7/2010 | Ogino ................ B60H 1/00271 219/202 |
| 2016/0021704 | A1* | 1/2016 | Elverud ................ H05B 3/145 219/549 |
| 2016/0059669 | A1 | 3/2016 | Sagou et al. |
| 2016/0167483 | A1 | 6/2016 | Satzger et al. |

FOREIGN PATENT DOCUMENTS

| | | |
|---|---|---|
| JP | 2005212556 A | 8/2005 |
| WO | 2012004971 A1 | 1/2012 |
| WO | 2016017067 A1 | 2/2016 |

OTHER PUBLICATIONS

English Machine Translation of DE102012221116A1.
English Machine Translation of JP2005212556A.
English Machine Translation of WO2012004971A1.
English Machine Translation of WO2016017067A1.

\* cited by examiner

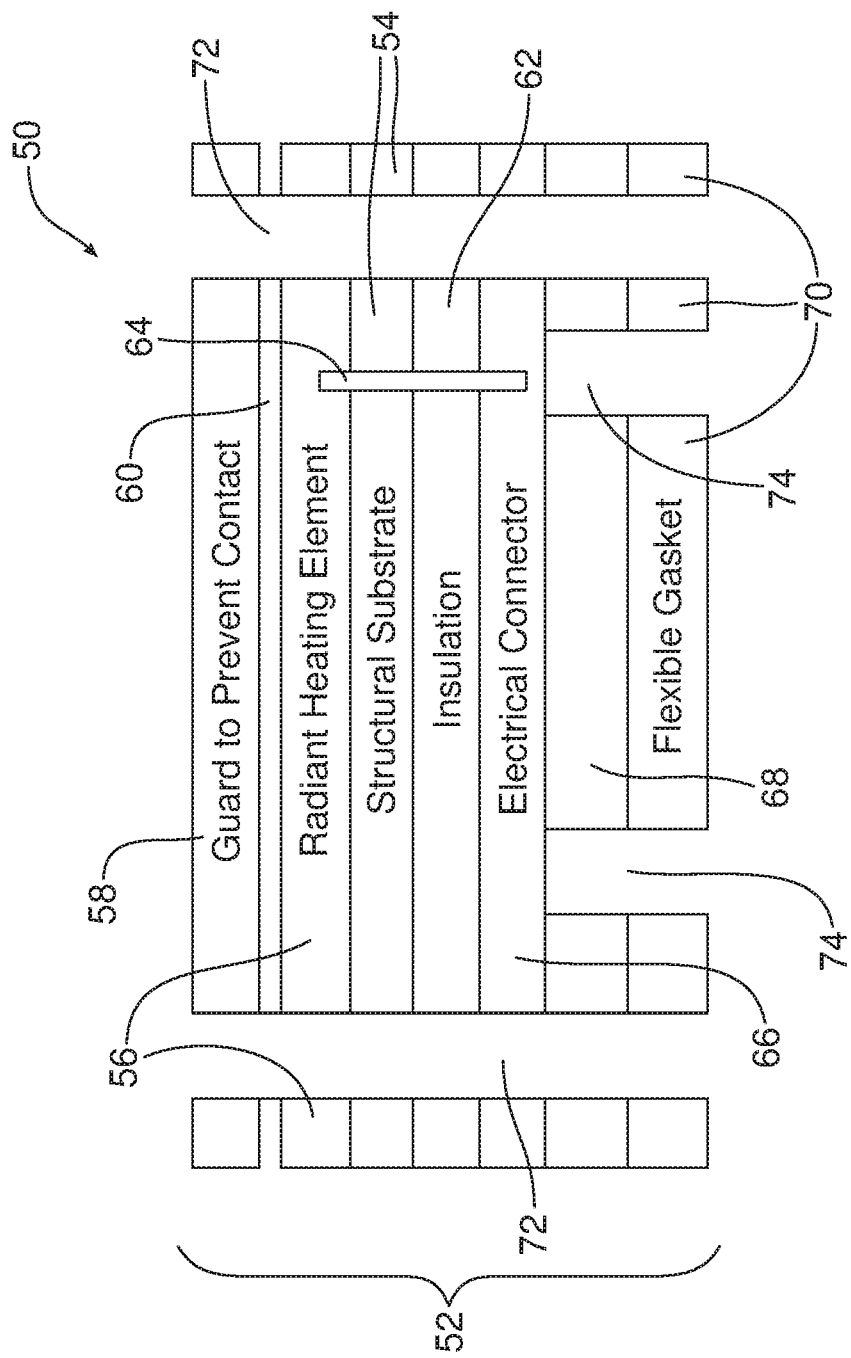

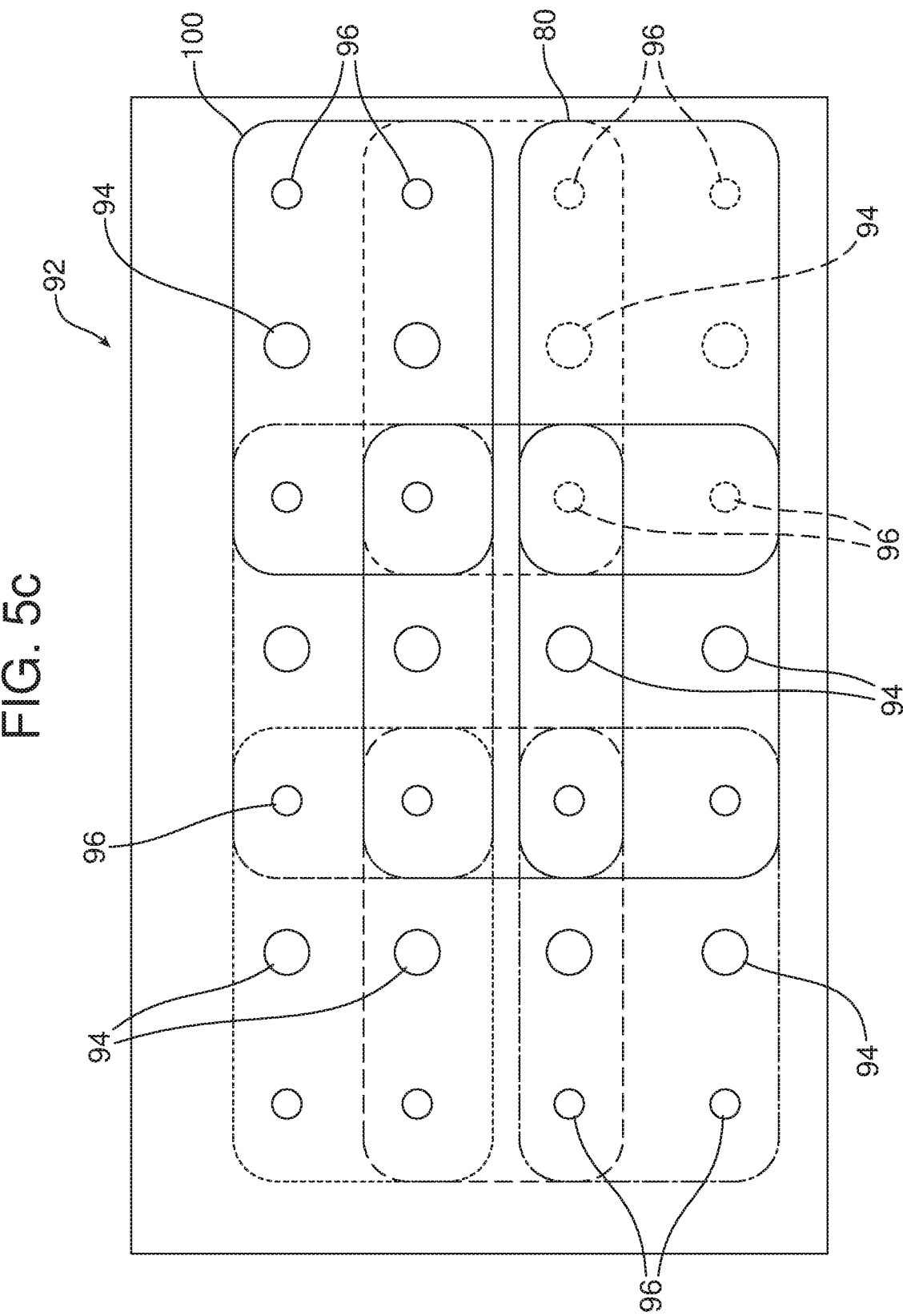

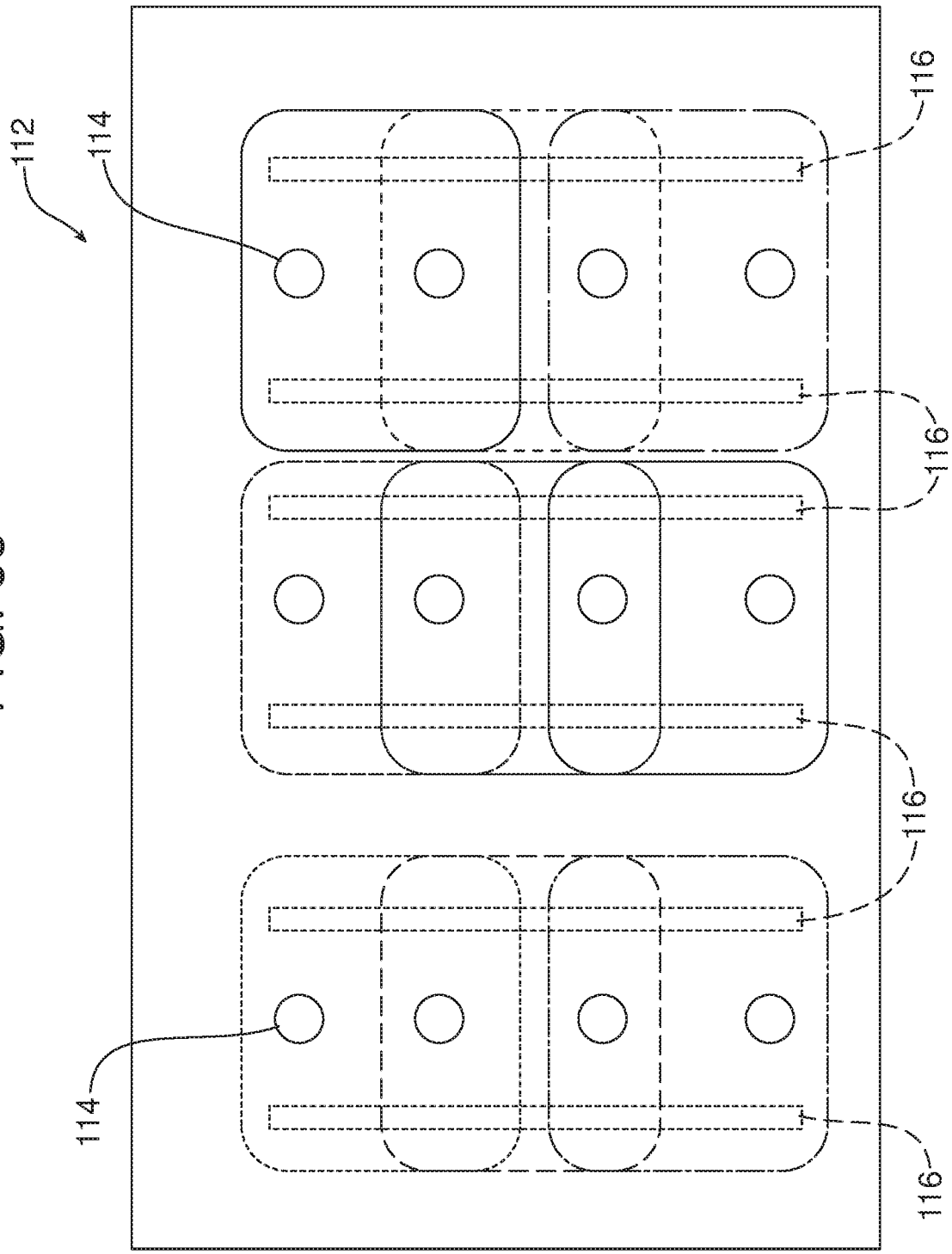

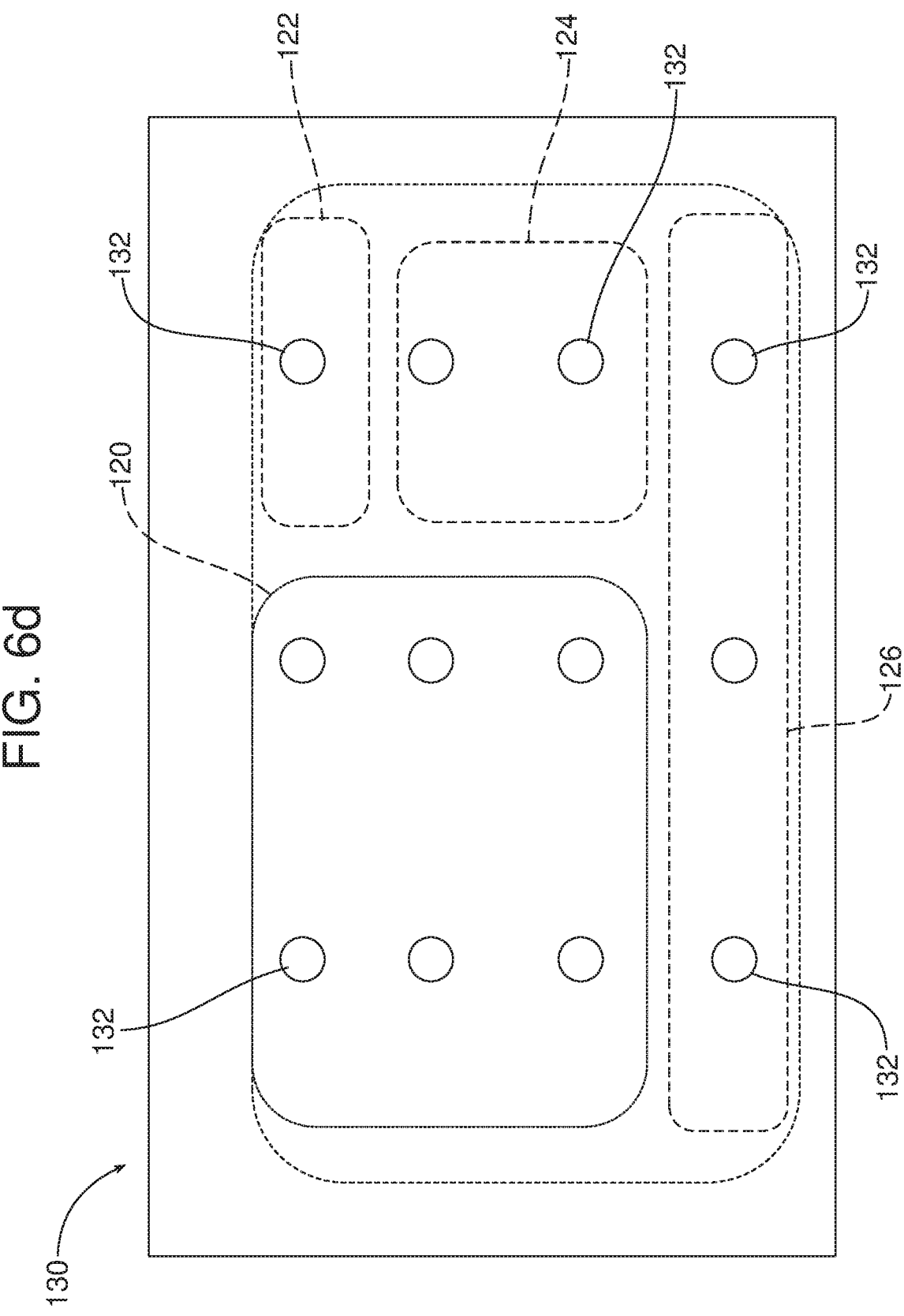

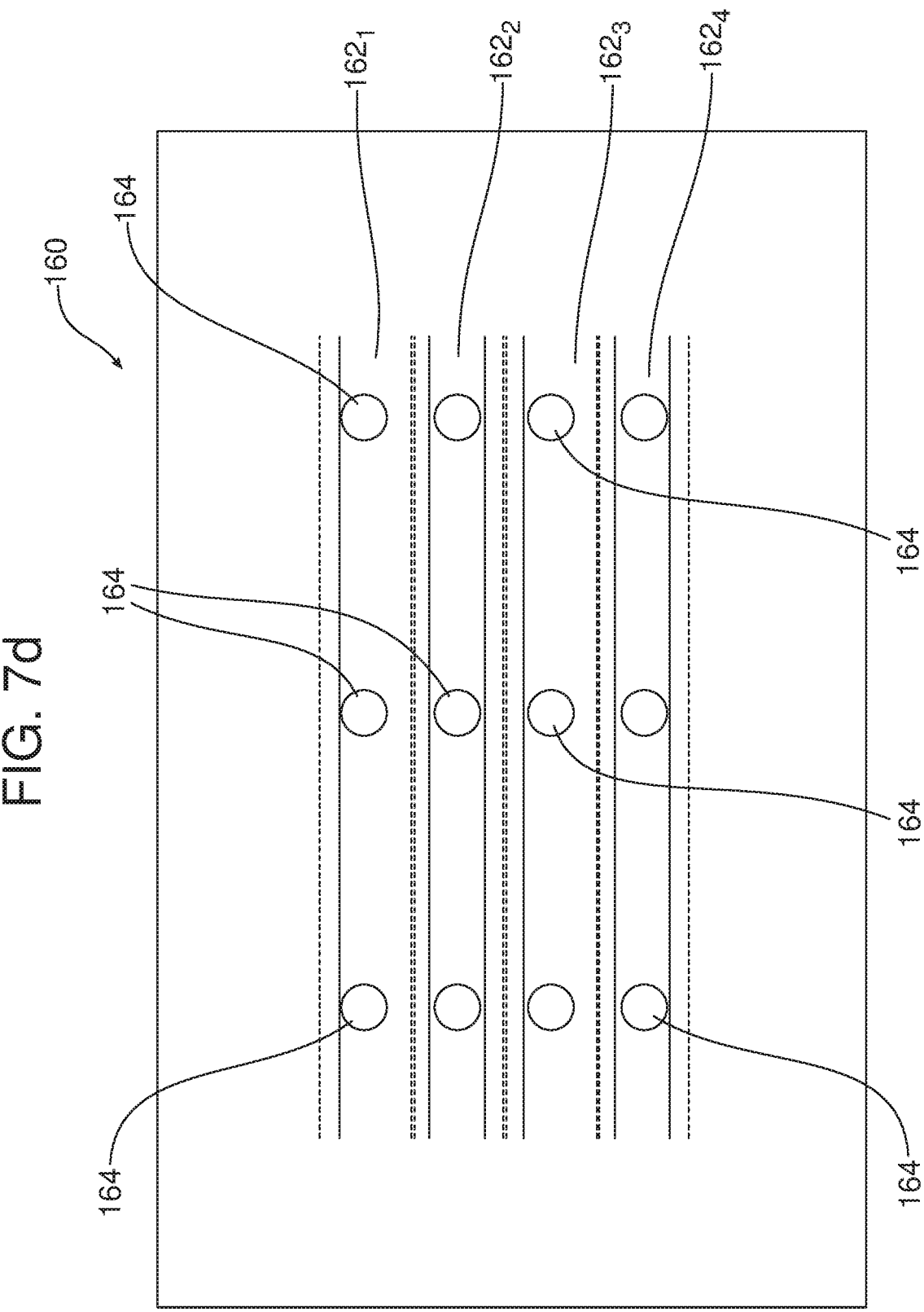

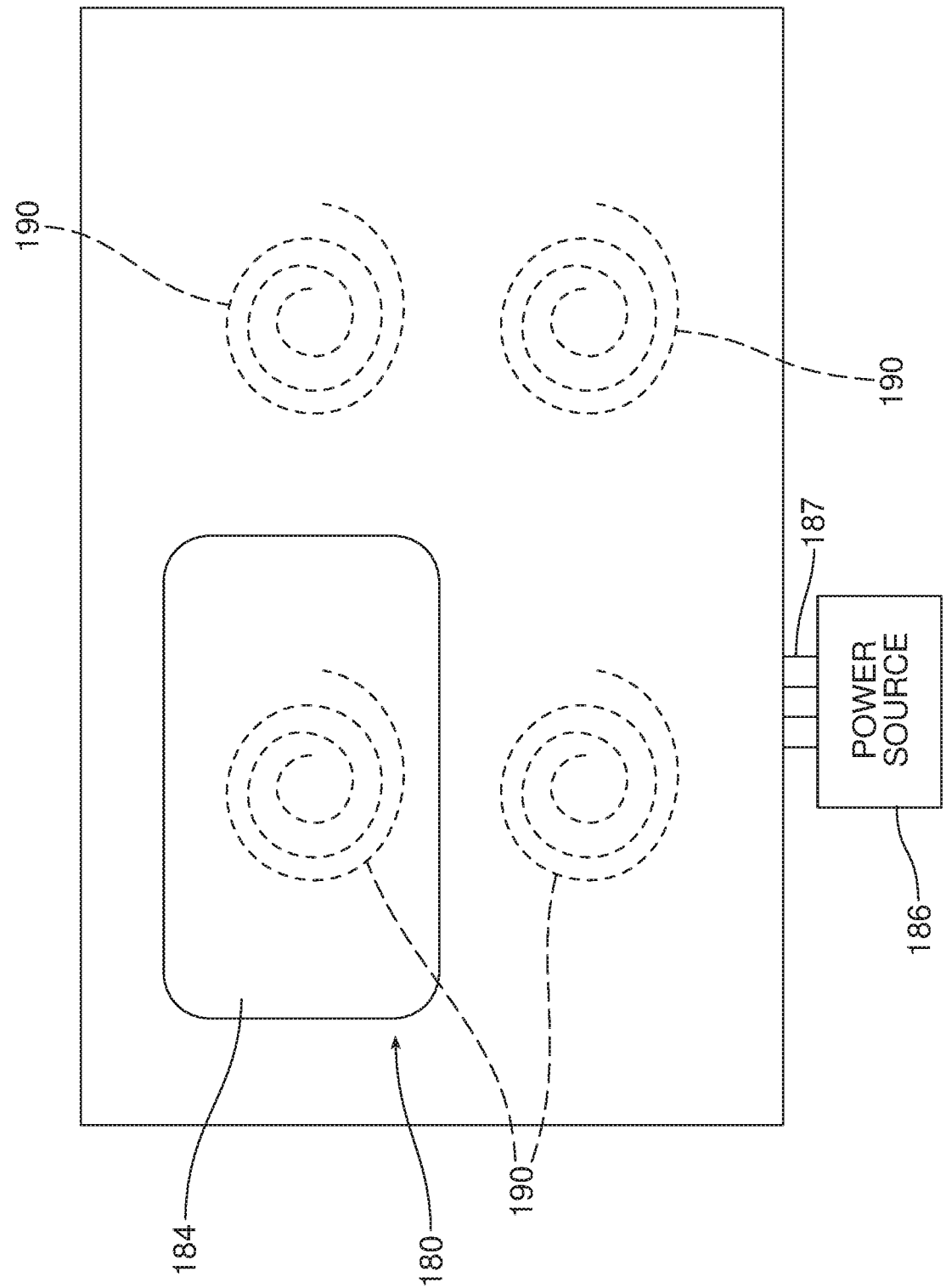

OPERATOR CONFIGURABLE RADIANT HEATING SYSTEM AND RELATED METHOD

TECHNICAL FIELD

This document relates generally to the motor vehicle equipment field and, more particularly, to an operator configurable radiant heating system as well as to a related method of customizing a radiant heating system in a motor vehicle to meet the preferred heating needs or desires of the operator.

BACKGROUND

A standard automobile heating, ventilating and air condition (HVAC) system heats by circulating air through a heater core where that air is put in a heat exchange relationship with coolant circulated from the motor vehicle engine. After the motor vehicle has been at rest in low temperature conditions for an extended period of time, the engine coolant cools to the ambient temperature and requires a substantial amount of time before the coolant heats sufficiently to provide heat to the air being circulated by the HVAC system. Further, the warmed air must first warm the ducts and blend with all the cold air in the passenger compartment of the motor vehicle before providing a significant warming sensation to the motor vehicle occupants. This delay can lead to occupant dissatisfaction.

While a motor vehicle may be equipped with positive temperature coefficient (PTC), heaters which under many conditions will reach air warming temperatures prior to engine coolant, such heaters still require time to heat the air in the passenger compartment of the motor vehicle. Additionally it should be appreciated that inefficiencies are currently built into combustion engines to meet climate targets (e.g. spark retard) affecting fuel economy. Further, the warming of air in cold situations in electric vehicles requires using some of the range to heat the vehicle.

This document relates to a new and improved radiant heating system for a motor vehicle that addresses and solves these issues.

SUMMARY

In accordance with the purposes and benefits described herein, an operator configurable radiant heating system is provided for a motor vehicle. That operator configurable radiant heating system comprises a plurality of docking points and a radiant heating panel. One docking point of the plurality of docking points is provided at a plurality of different locations in the motor vehicle. The radiant heating panel is configured for docking with any docking point of the plurality of docking points provided at those different locations.

Each docking point of the plurality of docking points may include a first power transmission feature and a first structural connector. The radiant heating panel may include a second power transmission feature and a second structural connector.

The first power transmission feature may comprise a first electrical connector and the second power transmission feature may comprise a second electrical connector that may be physically coupled to the first electrical connector. The first structural connector may be physically connected to the second structural connector.

In other possible embodiments, the first power transmission feature is a first coupling device and the second power transmission feature is a second coupling device whereby power is transmitted by induction. In such an embodiment the first structural connector may also be physically connected to the second structural connector.

The radiant heating panel may include a plurality of resistance heating elements carried on a substrate. That substrate may be flexible. That substrate may include at least one articulation so as to allow folding.

In some embodiments the first power transmission feature is carried on the first structural connector and the second power transmission feature is carried on the second structural connector.

The plurality of docking points may be provided at at least two locations within the motor vehicle. Those locations may be selected from a group of locations consisting of an instrument panel, a trim panel, a headliner, a center console, a foot well, a floor mat, a seat back, a door, a pillar, a package tray, a folding tray table, a removable roof panel, a convertible top, a roof panel, a seat bottom front and a headrest.

The operator configurable radiant heating system may further include a second radiant heating panel configured for docking with any other docking point of the plurality of docking points. The first radiant heating panel and the second radiant heating panel may differ in size. The first radiant heating panel and the second radiant heating panel may differ in shape. The first radiant heating panel and the second radiant heating panel may differ in both size and shape.

In accordance with an additional aspect, a method is provided of customizing a radiant heating system in a motor vehicle. That method comprises the steps of positioning a first radiant heating panel at a desired docking point selected from a plurality of docking points at different locations in the motor vehicle and activating the first radiant heating panel.

The method may include the step of connecting a first power transmission feature of the desired docking point to a second power transmission feature of the first radiant heating panel. Further, the method may include the step of connecting a first structural connector of the desired docking point to a second structural connector of the first radiant heating panel.

In some of the many possible embodiments, the method may include the steps of (a) removing the first radiant heating panel from a first storage location and (b) unfolding the first radiant heating panel before the positioning of the first radiant heating panel at the desired docking point. Following use, the method may include the steps of: (a) disconnecting the first power transmission feature from the second power transmission feature and the first structural connector from the second structural connector, (b) folding the first radiant heating panel and (c) returning the first radiant heating panel to the first storage location.

The method may also include the step of positioning a second radiant heating panel at a second desired docking point selected from the plurality of docking points in the motor vehicle and activating the second radiant heating panel.

In the following description, there are shown and described several preferred embodiments of the operator configurable radiant heating system as well as the method of customizing the radiant heating system in a motor vehicle. As it should be realized, the operator configurable radiant heating system and method are capable of other, different embodiments and their several details are capable of modification in various, obvious aspects all without departing from the heating system and method as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the operator configurable radiant heating system and the related method of customizing a radiant heating system in a motor vehicle and together with the description serve to explain certain principles thereof.

FIG. 4 is a schematic illustration of yet another possible configuration of radiant heating panel.

FIG. 5c is a schematic top plan illustration of a vehicle mounting surface for the radiant heating panel illustrated in FIGS. 5a and 5b that provides for nine separate docking points.

FIG. 6c is a top plan view of a vehicle mounting surface providing nine separate docking points for the radiant heating panel illustrated in FIGS. 6a and 6b.

FIG. 6d is a top plan view of a vehicle mounting surface or docking points illustrating connection to multiple radiant heating panels of different sizes and shapes.

FIG. 7d is a top plan view of a vehicle mounting surface providing a number of different docking points for mounting radiant heating panels of varying shapes.

FIG. 8c is a top plan view of a vehicle mounting surface with multiple docking points including a wireless power transmission coupling device complementary to such a coupling device provided in the radiant heating panel of FIGS. 8a and 8b.

Reference will now be made in detail to the present preferred embodiments of the operator configurable radiant heating system, examples of which are illustrated in the accompanying drawing figures.

DETAILED DESCRIPTION

Figure 1:
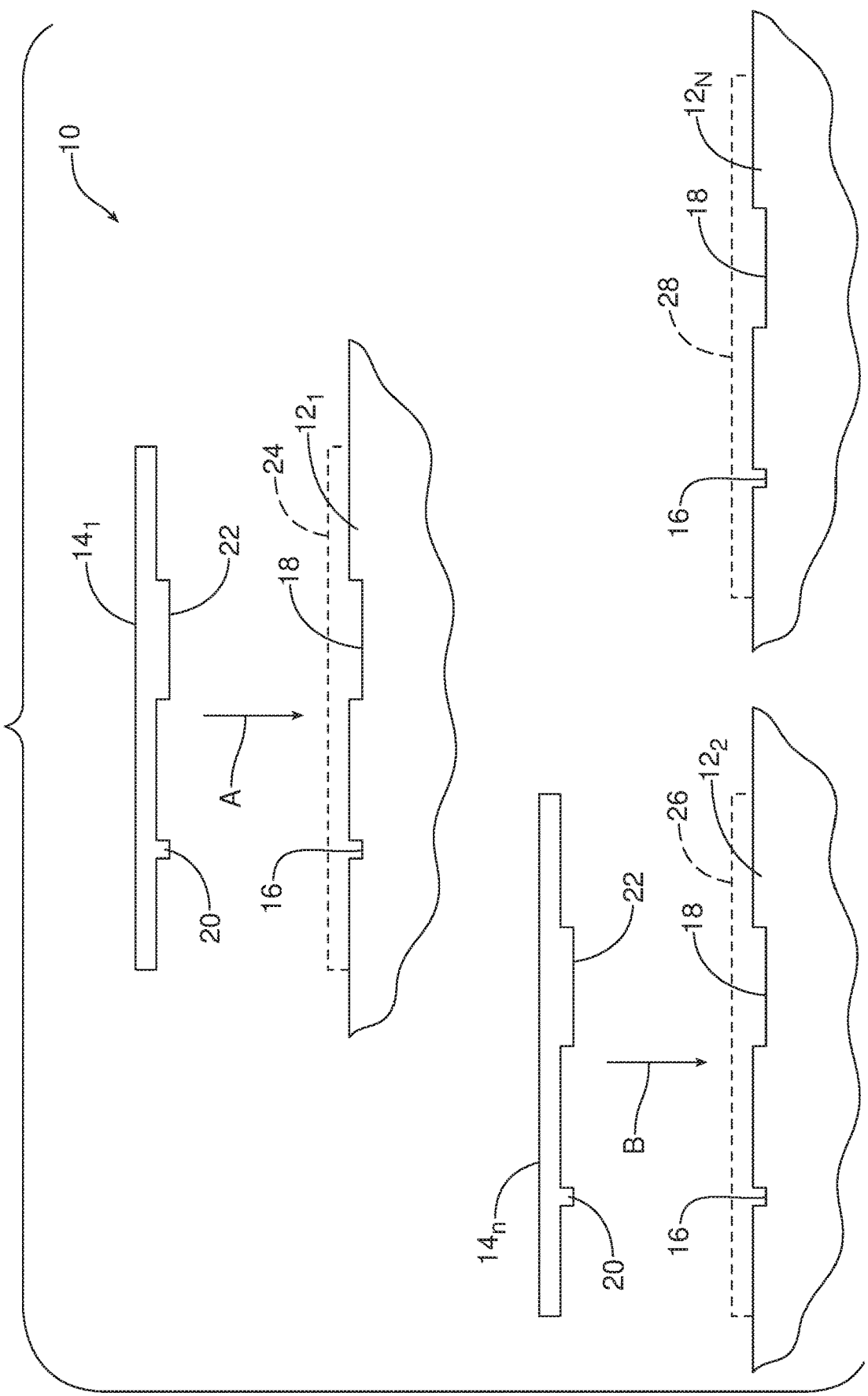
FIG. 1 is a schematic representation of the new and improved operator configurable radiant heating system.

Reference is now made to FIG. 1 which schematically illustrates the operator configurable radiant heating system 10 which may be utilized for a motor vehicle. The operator configurable radiant heating system 10 includes a plurality of docking points $12_1$-$12_n$. One docking point $12_1$-$12_n$ is provided at a plurality of different locations within the motor vehicle. Those various locations include but are not limited to an instrument panel, a trim panel, a headliner, a center console, a foot well, a floor mat, a seat back, a door, a pillar, a package tray, a folding tray table, a removable roof panel, a convertible top, a roof panel, a seat bottom front and a headrest within the motor vehicle.

As further illustrated in FIG. 1, the operator configurable radiant heating system 10 also includes one or more radiant heating panels: note first radiant heating panel $14_1$ and second radiant heating panel $14_n$ illustrated in FIG. 1. As further schematically illustrated in FIG. 1, each docking point $12_1$-$12_n$ includes a first power transmission feature 16 and a first structural connector 18. Each radiant heating panel $14_1$-$14_n$ includes a second power transmission feature 20 and a second structural connector 22.

The first power transmission feature 16 may comprise a first electrical connector and the second power transmission feature 20 may comprise a second electrical connector that may be physically coupled to the first electrical connector in order to complete an electrical connection. Similarly, the first structural connector 18 may be physically connected to the second structural connector 22 to complete a structural connection.

As should be appreciated from reviewing FIG. 1, any of the radiant heating panels $14_1$-$14_n$ may be electrically and structurally connected to any of the docking points $12_1$-$12_n$. In the embodiment illustrated in FIG. 1, the first radiant heating panel $14_1$ is shown being connected by action arrow A to the first docking point $12_1$ while the second radiant heating panel $14_n$ is shown being connected to the second docking point $12_2$ by action arrow B.

FIG. 1 illustrates the first radiant heating panel $14_1$ fully connected to the first docking point $12_1$ at the phantom line 24 (note the second power transmission feature 20 engaged in the first power transmission feature 16 and the second structural connector 22 engaged in the first structural connector 18). FIG. 1 also shows the second radiant heating panel $14_n$ fully connected to the second docking point $12_2$ at the phantom line 26. Note the second power transmission feature 20 engaged in the first power transmission feature 16 and the second structural connector 22 engaged in the first structural connector 18.

A third phantom line 28 at the third docking point $12_n$ illustrates the position in which either the first radiant heating panel $14_1$ or second radiant heating panel $14_n$ could have been connected to the third docking point $12_n$ if it had been desired by the operator configuring the operator configurable radiant heating system 10.

Figure 2A:
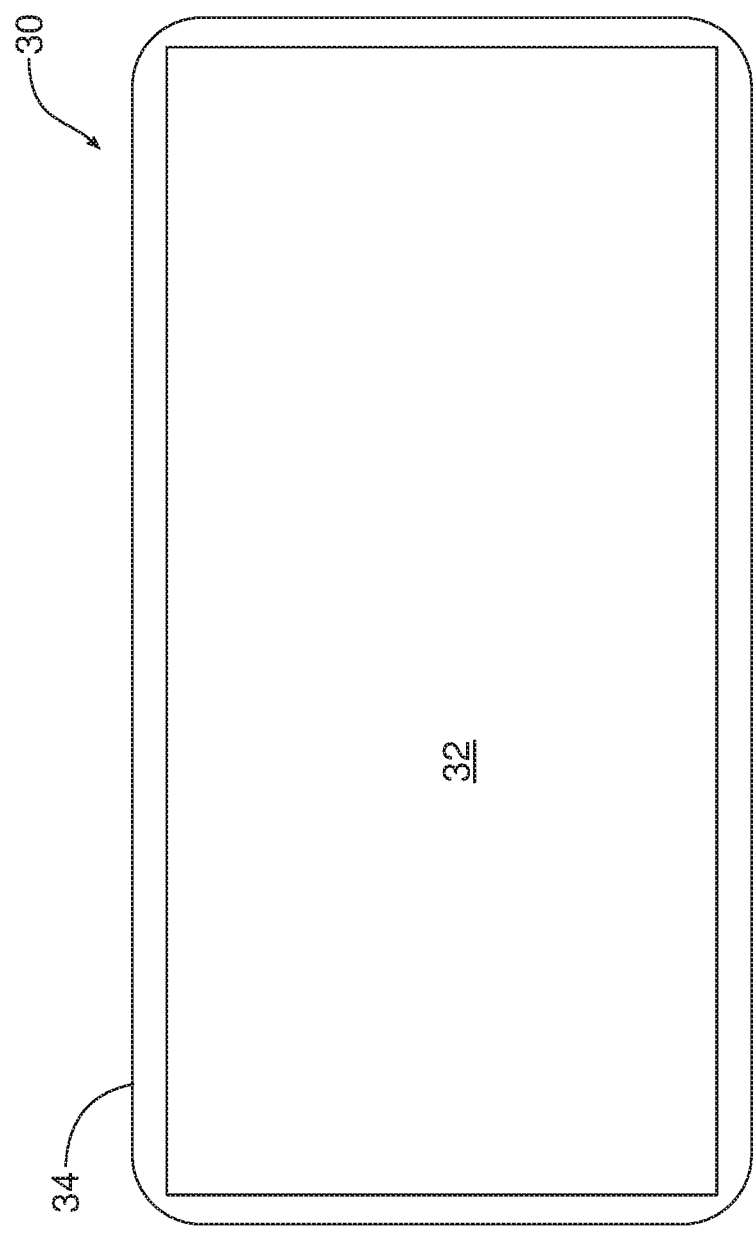
FIGS. 2a and 2b are respective top plan and side elevational views of one possible embodiment of radiant heating panel utilized in the operator configurable radiant heating system illustrated in FIG. 1.
Figure 2B:
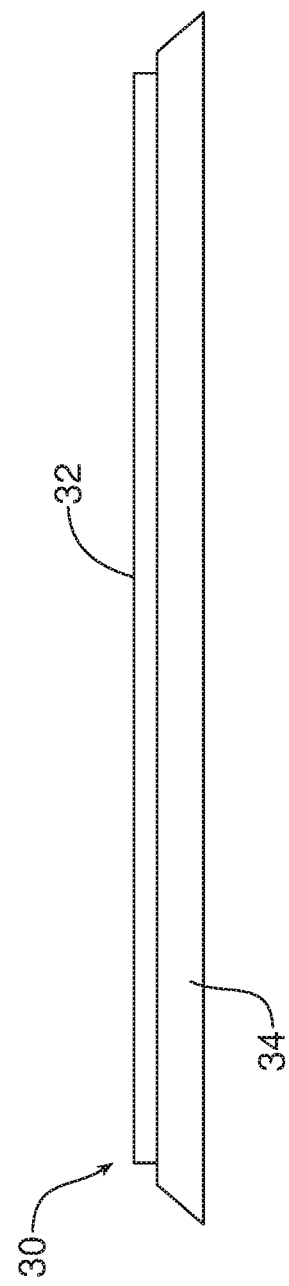

Reference is now made to FIGS. 2a and 2b illustrating one possible embodiment of radiant heating panel 30. In this embodiment, the radiant heating panel 30 comprises a radiant heat pad 32 having an outer margin or perimeter 34 constructed from an elastomeric material such as silicon or rubber to engage and grip the docking point $12_1$-$12_n$ to which the radiant heating panel 30 might be connected.

Figure 3:
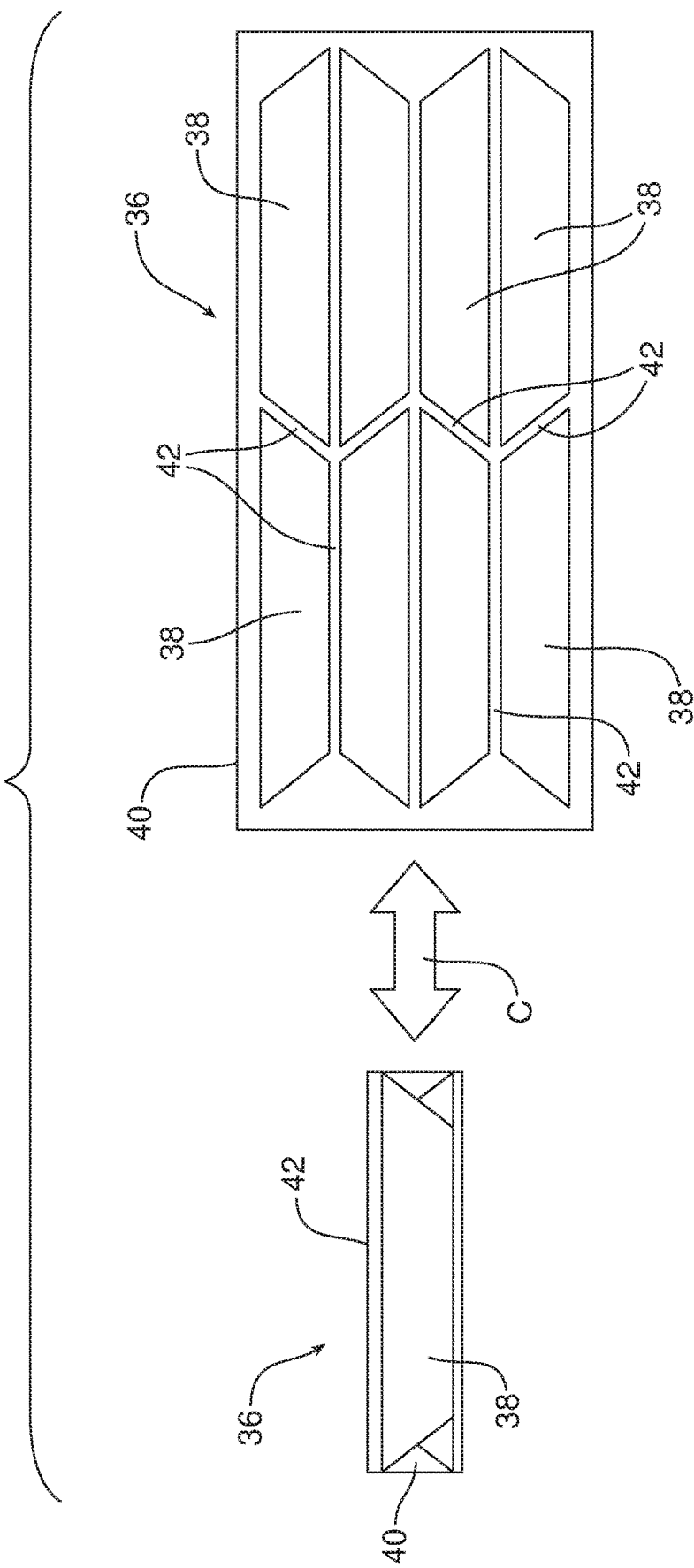
FIG. 3 is a schematic top plan view illustrating a second possible embodiment of radiant heating panel which includes a plurality of radiant heating elements carried on a flexible substrate incorporating a number of articulations.

Reference is now made to FIG. 3 illustrating yet another alternative embodiment of radiant heating panel 36. As illustrated, the radiant heating panel 36 includes a plurality of radiant heating elements 38 carried on a flexible substrate 40 including a plurality of articulations 42 that allow the radiant heating panel 36 to be converted back and forth between a collapsed or folded configuration illustrated to the left of action arrow C and an unfolded or erected configuration illustrated to the right of action arrow C. As should be appreciated, the articulations 42 serve as fold lines allowing the transition between the two configurations. For purposes of this document, an articulation may comprise a living hinge, a joint, a hinge, a pivot line or any other structure allowing for the folding of the radiant heating panel 36.

FIG. 4 is a schematic illustration of one possible embodiment of radiant heating panel 50 that may be utilized in the operator configurable radiant heating system 10 and connected to any one of the docking points $12_1$-$12_n$. The radiant heating panel 50 includes a body 52 comprising a plurality of different layers. In the illustrated embodiment the body 52 includes a structural substrate 54 for backing a radiant heating element 56. A guard 58 may be provided overlying the radiant heating element 56 to prevent one from directly touching the radiant heating element. An optional separation or gap 60 may be provided between the guard 58 and the radiant heating element 56. The gap 60 may be air-filled, vented or a vacuum-sealed space. This mitigates some energy transfer to the guard material through conduction and convection thereby making the guard 58 cooler to the touch.

The structural substrate 54 may be supported on an appropriate insulation layer 62. Wiring 64 connects the radiant heating element 56 with the second power transmission feature or electrical connector 66 under the insulation layer 62.

In one possible embodiment, a magnet 68 may be provided between the electrical connector 66 and the flexible gasket 70 at the bottom of the radiant heating panel 50. The gasket 70 conforms to the surface shape of the docking point $12_1$-$12_n$ to which the radiant heating panel 50 is connected. The attachment magnet 68 may be replaced with the through bores 72 that provide a pass-through opening for a screw of other pass-through attachment. The bores 70 may comprise blind holes and/or indentations for snap/detent/electrical connectors to provide power to the electrical connector 66 from a power source of the motor vehicle and/or structural connections to the motor vehicle.

Figure 5A:
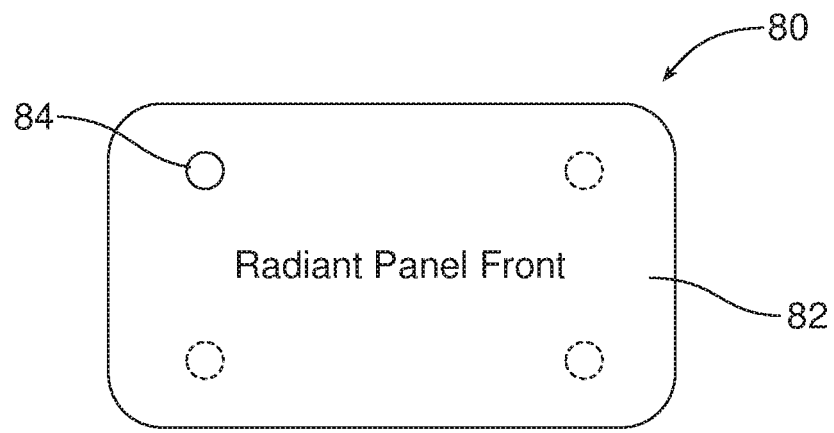
FIGS. 5a and 5b are respective front elevational and rear elevational views of another configuration of heating panel.
Figure 5B:
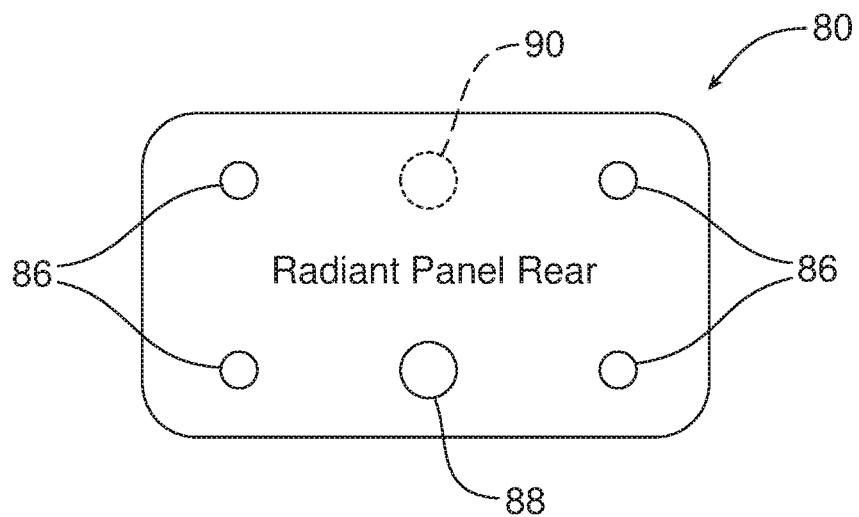

Reference is now made to FIGS. 5a and 5b which provide respective front and rear plan views of one possible embodiment of radiant heating panel 80 including a substrate 82. The rear face of the panel 80 includes four structural connectors 86, one adjacent each corner of the device. The rear face also includes an electrical connector 88. A second, optional electrical connector 90 may also be provided.

The radiant heating panel 80 illustrated in FIGS. 5a and 5b may be mounted at nine different locations at the vehicle mounting surface or docking point 92 illustrated in FIG. 5c. That docking point 92 includes a plurality of electrical connectors 94 for mating connecting with the electrical connectors 88 or 90 of the radiant heating panel 80 and a plurality of structural connectors 96 for mating connection with the structural connectors 86 on the radiant heating panel 80. As illustrated, the docking point 92 includes four rows and three columns of electrical connectors 94 and four rows and four columns of structural connectors 96. In the FIG. 5c, the radiant heating panel 80 is illustrated connected to the docking point 92 in the lower right-hand corner. A second radiant heating panel 100 is illustrated in the upper right-hand corner. The phantom lines illustrate seven other potential possible mounting positions/locations for a radiant heating panel of the same dimension as the radiant heating panels 80, 100 on the docking point 92. The structural connectors 86 and 96 in the embodiment of FIGS. 5a-5c may comprise a snap attachment, a screw attachment or other detent based attachment system.

Figure 6A:
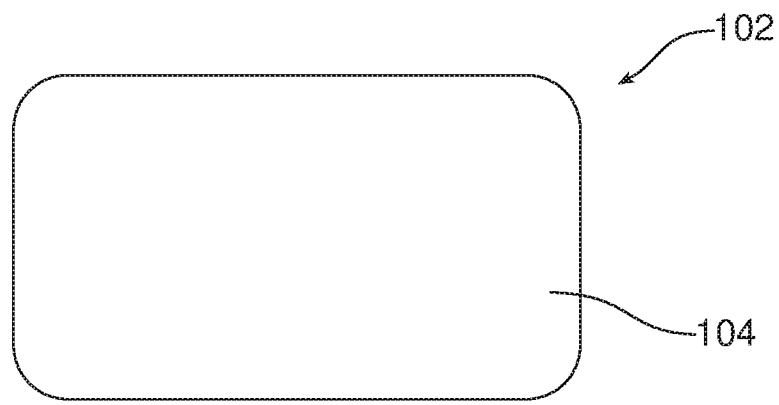
FIGS. 6a and 6b are respective front and rear elevational views of yet another possible embodiment of radiant heating panel.
Figure 6B:
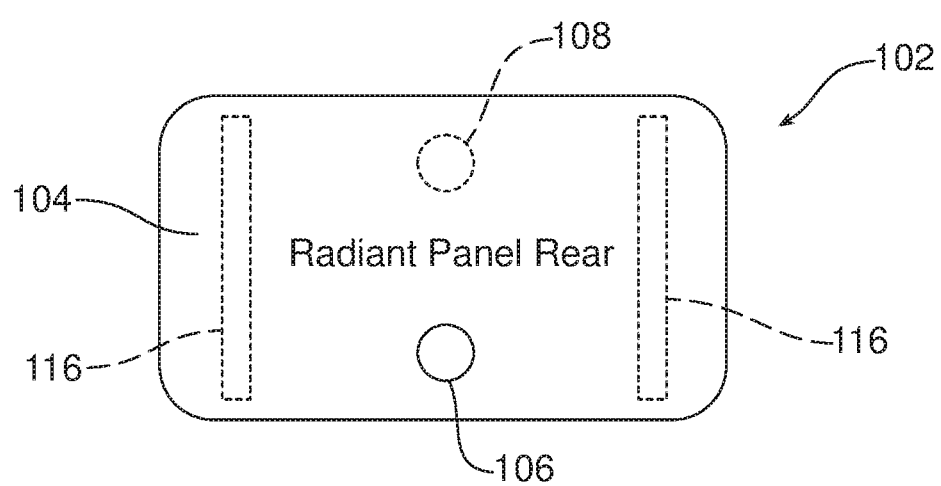

FIGS. 6a and 6b are respective front plan and rear plan views of yet another possible embodiment of radiant heating panel 102 including a substrate 104 with a single electrical connector 106 on the rear face thereof. A second, optional electrical connector 108 is also shown. FIG. 6c illustrates a docking point 112 including three columns and four rows of cooperating electrical connectors 114 adapted to engage and couple with the electrical connector 106 of the radiant heating panel 102. This embodiment allows for flush attachment of the radiant heating panel 102 to the docking point 112 via hook and loop fasteners, magnets or detents 116 provided in the radiant heating panel 102 and under the surface of the docking point. FIG. 6d illustrates how radiant heating panels 120, 122, 124, 126 of differing shape may be secured by hook and loop fasteners; magnets, detents or the like at various locations on the docking point 130. The aligned electrical contacts are illustrated at 132.

Figure 7A:
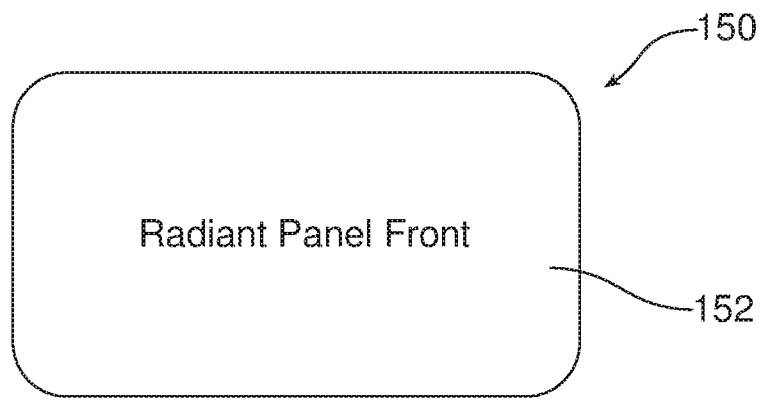
FIGS. 7a and 7b are respective front and rear elevational views of still another possible embodiment of radiant heating panel.
Figure 7B:
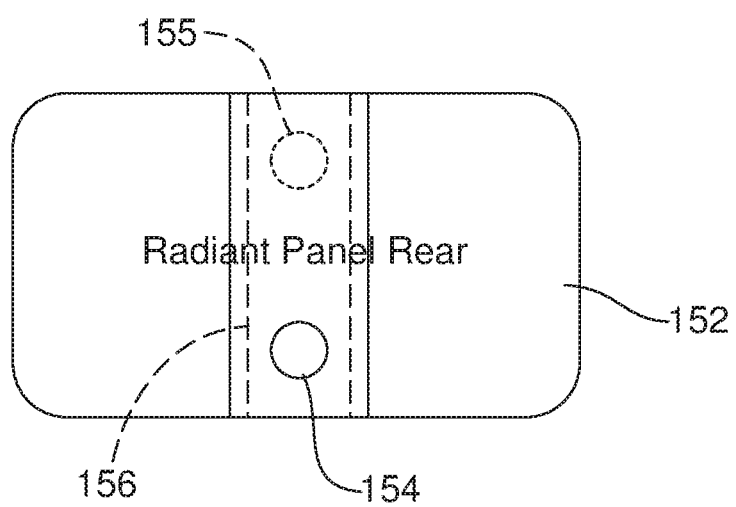
Figure 7C:
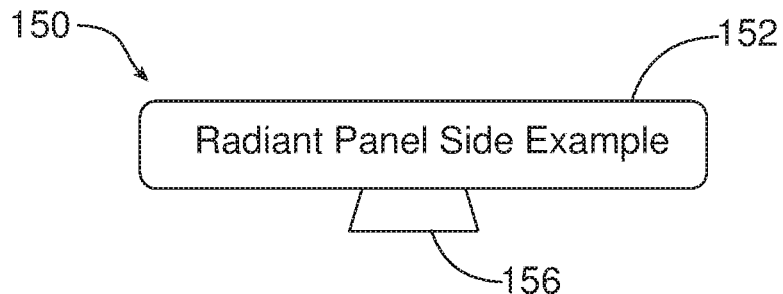
FIG. 7c is an end elevational view of the radiant heating panel illustrated in FIGS. 7a and 7b.

FIGS. 7a-7c are respective front elevational, rear elevational and side elevational views of yet another possible embodiment of radiant heating panel 150 including a substrate 152 and an electrical connector 154 (also note second, optional electrical connector at 155). In the illustrated embodiment, the radiant heating panel 150 also includes a projecting dovetail guide 156, the electrical connectors 154 being provided along the guide.

As illustrated in FIG. 7d, the docking point 160 includes four channels $162_1$, $162_2$, $162_3$, and $162_4$, for receiving and holding the dovetail guide 156 on the rear of the radiant heating panel 150. Electrical contacts/connectors 164 are provided at various locations along the guide tracks $162_1$-$162_4$. The radiant heating panel 150 may be positioned at various locations on the docking point 160 by inserting the dovetail guide 156 in either end of any of the channels $162_1$-$162_4$ and aligning the electrical connector 154 with any of the electrical contacts/connectors 164. The docking point 160 may receive and hold radiant heating panels of various shapes and sizes so long as the dovetail guide 156 on the rear of those panels properly engages in any one of the guide tracks $162_1$-$162_4$ and the electrical connector 154 on the panel and the electrical contact/connector 164 in the guide tracks can be aligned to complete the electrical connection. As should be appreciated, the structural connection features could be reversed. Thus, multiple dovetail guides 156 could be provided on the docking point 160 and a single guide track $162$, could be provided on the rear face of the radiant heating panel 150. Cooperating electrical connectors 154, 164 could also be provided within the dovetail guide and the guide track.

Figure 8A:
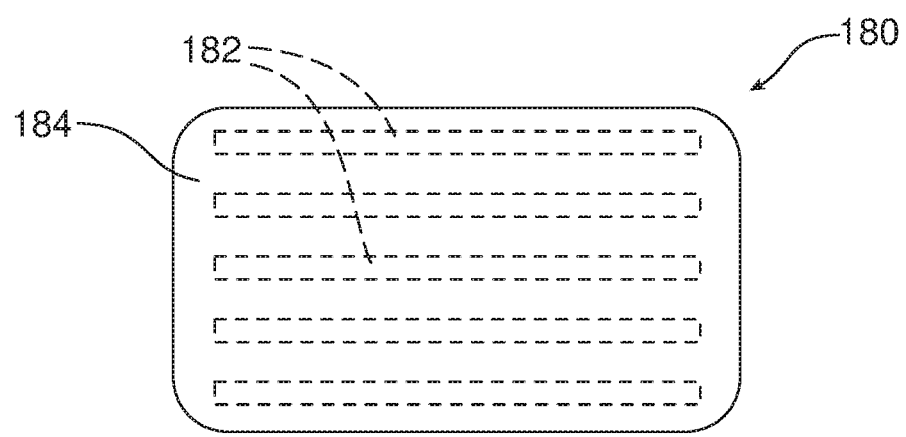
FIGS. 8a and 8b are respective top plan and bottom plan views of yet another possible embodiment of radiant heating panel incorporating a wireless power transmission coupling device.
Figure 8B:
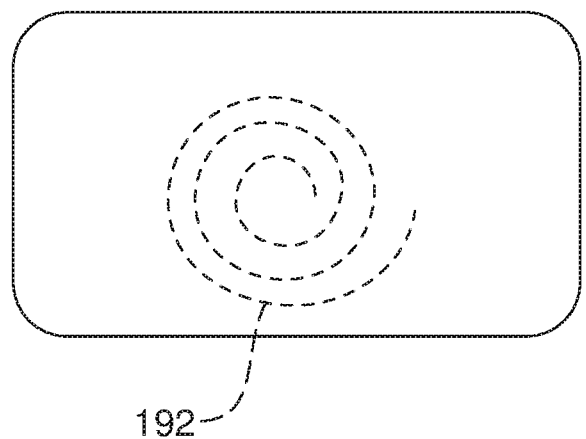
Figure 8D:
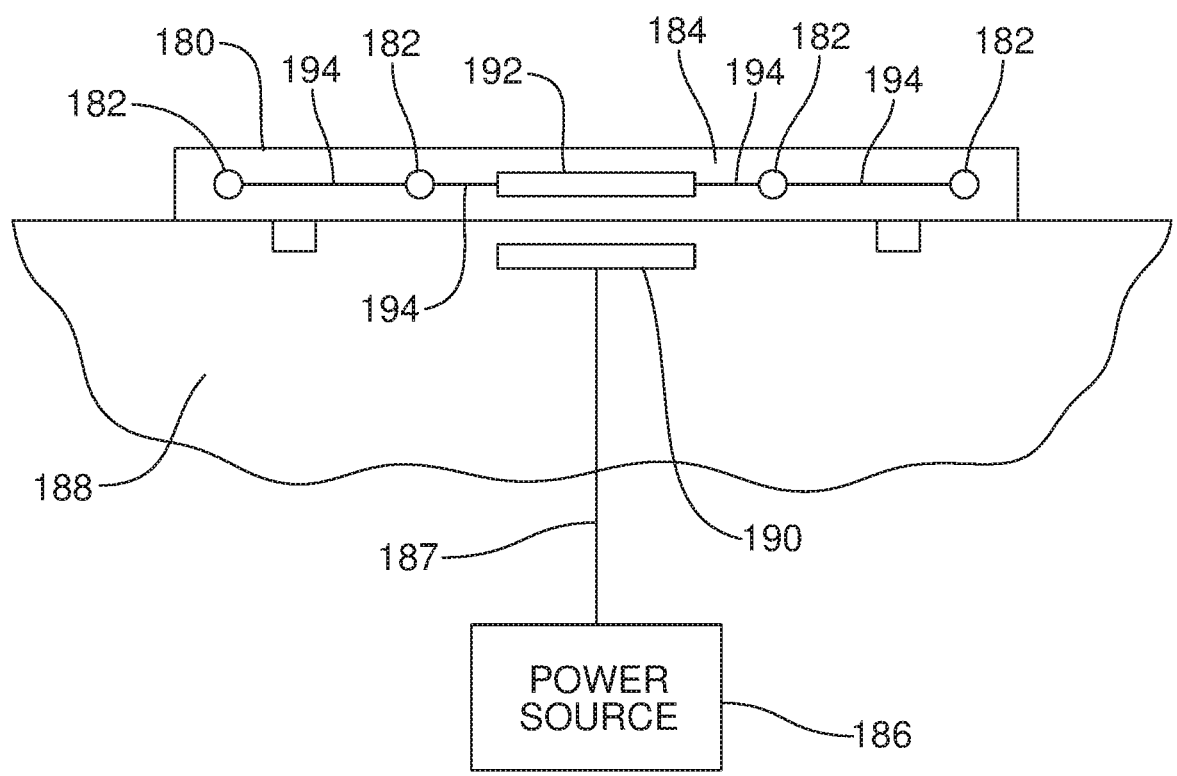
FIG. 8d is a schematic side elevational view illustrating the radiant heating panel illustrated in FIGS. 8a and 8b fixed at a desired docking point as illustrated in FIG. 8c with cooperating coupling devices in the radiant heating panel and at the docking point allowing for wireless power transmission to the radiant heating panel from a power source of the motor vehicle.

FIGS. 8a-8d illustrate yet another possible embodiment of radiant heating panel 180 that allows for wireless power transfer between the resistive heating elements 182 in the substrate 184 of the radiant heating panel and the power source 186 of the motor vehicle. More specifically, the docking point 188 includes a first power transmission feature in the form of a first coupling device 190. Four coupling devices 190 are shown in FIG. 8c. The power source 186 of the motor vehicle is connected to the coupling devices 190. The radiant heating panel 180 includes a second power transmission feature in the form of a second coupling device 192 embedded in the substrate 184 of the panel. When the radiant heating panel 180 is secured to the docking point 188 with the coupling devices 190, 192 aligned and adjacent to one another through the use of location or fastening systems useful for this intended purpose, power is transmitted by induction between the devices. Thus, as illustrated in FIG. 8*d*, power from the motor vehicle power source 186 is delivered through hard wiring or other means (note lead 187) to the first coupling device 190. That power is then transmitted by induction to the second coupling device 192 in the radiant heating panel 180. The power is then transmitted by wiring 194 to the various resistive heating elements 182 in the radiant heating panel.

Consistent with the above description, a method is provided of customizing a radiant heating system 10 in a motor vehicle. That method may be broadly described as comprising the steps of positioning a first radiant heating panel 14$_1$ at a desired docking point 12$_1$-12$_n$ selected from a plurality of different docking points provided at different locations within the motor vehicle and then activating that first radiant heating panel.

The method may further include the step of connecting a first power transmission feature 16 of the desired docking point 12$_1$-12$_n$ to a second power transmission feature 20 of the first radiant heating panel 14$_1$. Further, the method may include the step of connecting a first structural connector 18 of the desired docking point 12$_1$-12$_n$ to a second structural connector 22 of the first radiant heating panel 14$_1$.

In some embodiments the method may include the steps of (a) removing the first radiant heating panel 30 from a first storage location and (b) unfolding that first radiant heating panel (see FIG. 3) before positioning the radiant heating panel at the desired docking point 12$_1$-12$_n$. Further, the method may include disconnecting the first power transmission from the second power transmission feature 20 and the first structural connector 18 from the second structural connector 22, folding the radiant heating panel 30 into a collapsed condition and returning the radiant heating panel to the first storage location. Still further, the method may include the step of positioning a second radiant heating panel 14$_n$ at a second desired docking point selected from the plurality of docking points 12$_1$-12$_n$ located throughout the motor vehicle and then activating the second radiant heating panel.

The foregoing has been presented for purposes of illustration and description. It is not intended to be exhaustive or to limit the embodiments to the precise form disclosed. Obvious modifications and variations are possible in light of the above teachings. For example, the cooperating features 16 and 20 illustrated in FIG. 1 may comprise combined power transmission and structural connectors so that two single cooperating elements provide both power and structural connection between the radiant heating panels 14$_1$, 14$_n$ and the docking points 12$_1$-12$_n$. It should be appreciated that any of the radiant heating panels could include an actuator, such as a knob, slider or the like, on the front face or edge thereof to allow one to locally activate, deactivate and adjust intensity of the radiant heating panel. All such modifications and variations are within the scope of the appended claims when interpreted in accordance with the breadth to which they are fairly, legally and equitably entitled.

What is claimed:

1. An operator configurable radiant heating system for a motor vehicle, comprising:

a plurality of docking points, one docking point of said plurality of docking points being provided at a plurality of different locations in said motor vehicle; and a first radiant heating panel configured for docking with any docking point of said plurality of docking points wherein each docking point of said plurality of docking points includes a first power transmission feature and a first structural connector.

2. The operator configurable radiant heating system of claim 1, wherein said first radiant heating panel includes a second power transmission feature and a second structural connector.

3. The operator configurable radiant heating system of claim 2, wherein said first power transmission feature is a first electrical connector and said second power transmission feature is a second electrical connector physically coupled to said first electrical connector.

4. The operator configurable radiant heating system of claim 3, wherein said first structural connector is physically connected to said second structural connector.

5. The operator configurable radiant heating system of claim 2, wherein said first power transmission feature is a first coupling device and said second power transmission feature is a second coupling device whereby power is transmitted by induction.

6. The operator configurable radiant heating system of claim 5, wherein said first structural connector is physically connected to said second structural connector.

7. The operator configurable radiant heating system of claim 2, wherein said first radiant heating panel includes a plurality of resistance heating elements carried on a substrate.

8. The operator configurable radiant heating system of claim 7, wherein said substrate is flexible.

9. The operator configurable radiant heating system of claim 7, wherein said substrate includes at least one articulation.

10. The operator configurable radiant heating system of claim 2, wherein said first power transmission feature is carried on said first structural connector and said second power transmission feature is carried on said second structural connector.

11. The operator configurable radiant heating system of claim 1, wherein said plurality of docking points are provided at least two locations selected from a group of locations consisting of an instrument panel, a trim panel, a headliner, a center console, a foot well, a floor mat, a seat back, a door, a pillar, a package tray, a folding tray table, a removable roof panel, a convertible top, a roof panel, a seat bottom front and a headrest.

12. The operator configurable radiant heating system of claim 1, further including a second radiant heating panel configured for docking with any other docking point of said plurality of docking points.

13. The operator configurable radiant heating system of claim 12, wherein said first radiant heating panel and said second radiant heating panel differ in size, in shape or in size and shape.

14. A method of customizing a radiant heating system in a motor vehicle, comprising:

positioning a first radiant heating panel at a desired docking point selected from a plurality of docking points at different locations in said motor vehicle; and activating said first radiant heating panel.

15. The method of claim 14, including connecting a first power transmission feature of said desired docking point to a second power transmission feature of said first radiant heating panel.

16. The method of claim 15, including connecting a first structural connector of said desired docking point to a second structural connector of said first radiant heating panel.

17. The method of claim 16, including (a) removing said first radiant heating panel from a first storage location and (b) unfolding said first radiant heating panel before said positioning of said first radiant heating panel at said desired docking point.

18. The method of claim 17, including (a) disconnecting said first power transmission feature from said second power transmission feature and said first structural connector from said second structural connector (b) folding said first radiant heating panel and (c) returning said first radiant heating panel to said first storage location.

19. The method of claim 14, further including positioning a second radiant heating panel at a second desired docking point selected from plurality of docking points in said motor vehicle and activating said second radiant heating panel.

20. The method of claim 14 including moving said first radiant heating panel from the desired docking point to another docking point at a different location in the motor vehicle.

* * * * *